US008370925B2

(12) United States Patent
Childress et al.

(10) Patent No.: US 8,370,925 B2
(45) Date of Patent: Feb. 5, 2013

(54) USER POLICY MANAGEABLE STRENGTH-BASED PASSWORD AGING

(75) Inventors: Rhonda L. Childress, Austin, TX (US); Itzhack Goldberg, Hadera (IL); Moriel Lechtman, Haifa (IL); Yotam Medini, Binyamina (IL)

(73) Assignee: International Business Machines Corporation, Armonk, NY (US)

( * ) Notice: Subject to any disclaimer, the term of this patent is extended or adjusted under 35 U.S.C. 154(b) by 754 days.

(21) Appl. No.: 12/181,364

(22) Filed: Jul. 29, 2008

(65) Prior Publication Data
US 2010/0031343 A1 Feb. 4, 2010

(51) Int. Cl.
| | |
|---|---|
| *G06F 7/04* | (2006.01) |
| *G06F 12/00* | (2006.01) |
| *G06F 12/14* | (2006.01) |
| *G06F 13/00* | (2006.01) |
| *G06F 17/30* | (2006.01) |
| *G11C 7/00* | (2006.01) |

(52) U.S. Cl. .......................................... 726/18; 380/247
(58) Field of Classification Search ................ 726/18; 713/182
See application file for complete search history.

(56) References Cited

U.S. PATENT DOCUMENTS

| 7,103,912 B2 * | 9/2006 | Xia et al. ........................... 726/8 |
| 2003/0009333 A1 | 1/2003 | Sharma et al. |
| 2005/0114673 A1 | 5/2005 | Raikar et al. |
| 2006/0259960 A1 * | 11/2006 | Kondo ............................... 726/6 |
| 2007/0006301 A1 | 1/2007 | Nickell et al. |
| 2007/0072616 A1 | 3/2007 | Irani |
| 2008/0114986 A1 * | 5/2008 | Morris et al. .................. 713/183 |
| 2008/0216170 A1 * | 9/2008 | Sanai et al. ...................... 726/18 |
| 2009/0158406 A1 * | 6/2009 | Jancula et al. ..................... 726/5 |

OTHER PUBLICATIONS

Peng Wang; Strengthening Password-Based Authentication Protocols Against Online Dictionary Attacks; Year: 2005; Springer; pp: 1-16.*
Hitachi ID Systems, Inc. "Password Policy Enforcement", retrieved from Internet on May 7, 2008, <URL:http://p-synch.com/security/password-policy-enforcement.html>.
Burns, Victor, "Security—Locking the Front Door of Password Security", Sys Admin Magazine, 2007, http://replay.waybackmachine.org/20071017210509/http://samag.com/documents/s=9366/sam0108g/0108g.htm.

* cited by examiner

*Primary Examiner* — Philip Chea
*Assistant Examiner* — Monjour Rahim
(74) *Attorney, Agent, or Firm* — Mitch Harris, Atty at Law, LLC; Andrew M. Harris; Mark C. Vallone

(57) ABSTRACT

Password aging based on the strength of the password provides an incentive for users to generate and/or memorize more complex passwords. The strength of the password is computed from a formula that relates the length of the password and the types of characters contained in the password to a strength value, which can be performed using a lookup table having values for different characteristics of the password, determining partial strength values corresponding to the ranges in which the characteristics fall, and then adding the partial strength values. Alternatively, a separate password strength application may be used to provide the strength value, which is entered by the user or administrator generating a new password. Alternatively, the password may be generated based on a specified desired expiration period, with the strength computation performed to ensure that the strength is sufficient to merit the desired expiration period.

11 Claims, 4 Drawing Sheets

USER POLICY MANAGEABLE STRENGTH-BASED PASSWORD AGING

BACKGROUND OF THE INVENTION

1. Field of the Invention

The present invention is related to computer systems management software, and more particularly to a password aging mechanism that considers the strength of the password and can be managed by user policy settings.

2. Description of Related Art

Workstation and systems password management is a pervasive problem. While it is typically desirable from a user's point-of-view to provide or permit the user to set a limited number of passwords or a single password that contains few characters and/or is easy for the user to remember, simple passwords are much easier to break using trial-and-error or other systematic attacks. Less simple passwords that are based on personally memorable concepts may be easily compromised if the underlying concept is known to be associated with the user that "owns" the password and are generally more susceptible to dictionary attacks, in which a dictionary of words is repetitively tried until access is granted.

In order to avoid the possibility of unauthorized access through breaking a user's password, two prevalent rules are applied: 1) the password must have a minimum level of "strength" (i.e., complexity); and 2) passwords are typically "expired" periodically. When a password is expired, a user is required to provide a new password or, in systems in which passwords are automatically generated, a new password is issued to replace the expired password. Password strength is computed based on rules that typically take into account the length of the password and the types of symbols and/or letter-case of characters included in the password.

The above-described strength requirement and password expiration techniques are frequently applied in combination. However, the two techniques are not typically inter-related. The typical password expiration technique "ages" all passwords equally, further increasing the motivation for a user to choose a password of minimum strength as the expiration period decreases, as the user will ideally need to memorize a new password more frequently. For automatically generated passwords, if passwords expire frequently, then a user is possibly more likely to generate and/or keep a written record of the password for a longer period of time. The user also typically has no control at all over the aging and the strength determinations, which are generally dictated by the security subsystem in their workstation and/or network sites and applications to which the user connects.

Therefore, it would be desirable to provide a password aging technique that does not tempt users to select weak passwords or maintain long-term written records of passwords, and provides a level of user control over the password aging and/or the password strength computation processes.

BRIEF SUMMARY OF THE INVENTION

The invention is embodied in a computer-performed method, computer program product and computer system that provide for password aging based on password strength.

The password is entered by a user or administrator of the computer system. The password strength is either computed by the password management software or entered by the user or administrator from a separate strength-calculating application. The password is put into effect to control access to one or more resources of the computer system or a connected network and the age of the password is tracked against an expiration period computed in conformity with the password strength. When the age of the password reaches the expiration period, access to the resource(s) is denied and the user or administrator must enter a new password. Alternatively the password management software may generate the new password automatically, computing the password strength to ensure that the password merits a specified expiration period.

The password strength can be computer using a lookup table having values for different characteristics of the password, determining partial strength values corresponding to the ranges in which the individual characteristics fall, and then adding the partial strength values.

The foregoing and other objectives, features, and advantages of the invention will be apparent from the following, more particular, description of the preferred embodiment of the invention, as illustrated in the accompanying drawings.

BRIEF DESCRIPTION OF THE SEVERAL VIEWS OF THE DRAWING

The novel features believed characteristic of the invention are set forth in the appended claims. The invention itself, however, as well as a preferred mode of use, further objectives, and advantages thereof, will best be understood by reference to the following detailed description of the invention when read in conjunction with the accompanying Figures, wherein like reference numerals indicate like components, and:

DETAILED DESCRIPTION OF THE INVENTION

The present invention relates to password management systems and software in which the expiration of a password is related to the strength of the password, so that stronger passwords are given longer periods of validity. The expiration period may be set in conformity with a calculated strength of the password, or a password may be generated based on a desired expiration period.

Figure 1:
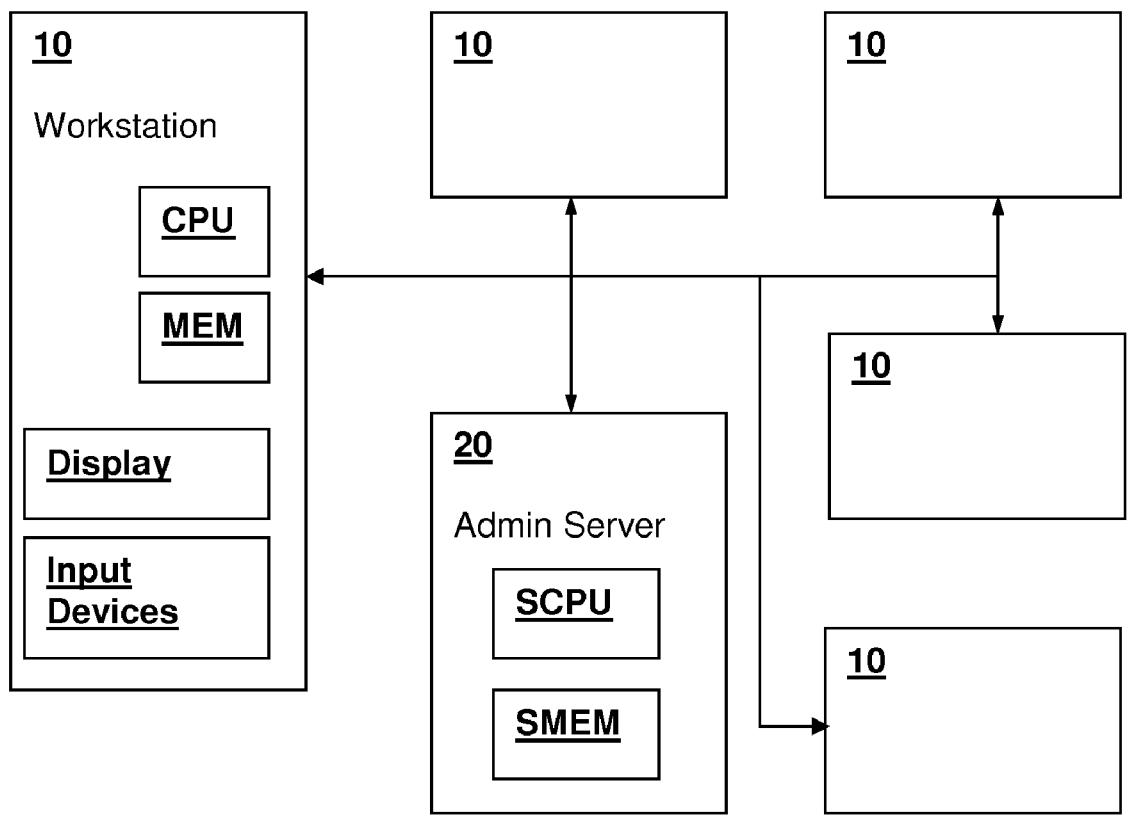
FIG. 1 is a block diagram illustrating a networked computer system in which techniques according to an embodiment of the present invention are practiced.

Referring now to FIG. 1, a networked computer system in which an embodiment of the present invention is practiced is depicted in a block diagram. An administrative server 20 includes a server processor SCPU coupled to a server memory SMEM that contains program instructions for implementing a system in accordance with an embodiment of the present invention and forming a computer-program product in accordance with another embodiment of the present invention. Administrative server 20 is coupled to a number of workstation computers 10, which in the depicted embodiment each include a workstation processor CPU coupled to a workstation memory MEM that contains program instructions for implementing another portion of the system and forming a computer-program product in accordance with another embodiment of the present invention. In general the password management software of the present invention may be located in a single-user computer system, for which workstation computers 10 provide an example, or maybe implemented within administrative server 20, with only login objects and user interfaces for controlling the password management software instantiated on workstation computers 10 deployed from administrative server 20. Workstation computers 10 are also depicted as including a graphical display Display and input devices Input Devices, such as mice and keyboards, for interacting with a user interface as described in further detail below. Workstation computers 10 are coupled to administrative server 20 over network, which may include wireless local area networks (WLANs), wired local-area networks (LANs), wide-area networks (WANs) or any other suitable interconnection that provides communication between administrative server 20 and workstation computers 10. Further, the present invention concerns password aging and password generation/selection techniques that are not limited to a specific computer system configuration or requiring a network at all, as some embodiments of the present invention are applicable to individual computer systems, hand-held devices and in general, any system that may be protected by a password. The network-informed embodiments of the present invention retain some functionality even in off-line configurations, such as when administrative server 20 manages passwords used to access local resources on a workstation 10. Finally, the specification of an administrative server 20 and workstation 10 and the location of their specific memories MEM and SMEM does not imply a specific client-server relationship or hierarchical organization, as the techniques of the present invention may be employed in distributed systems in which the administrative role, if employed at all, is defined by an identity and control privilege, rather than by association with a particular location or hardware type.

Figure 2:
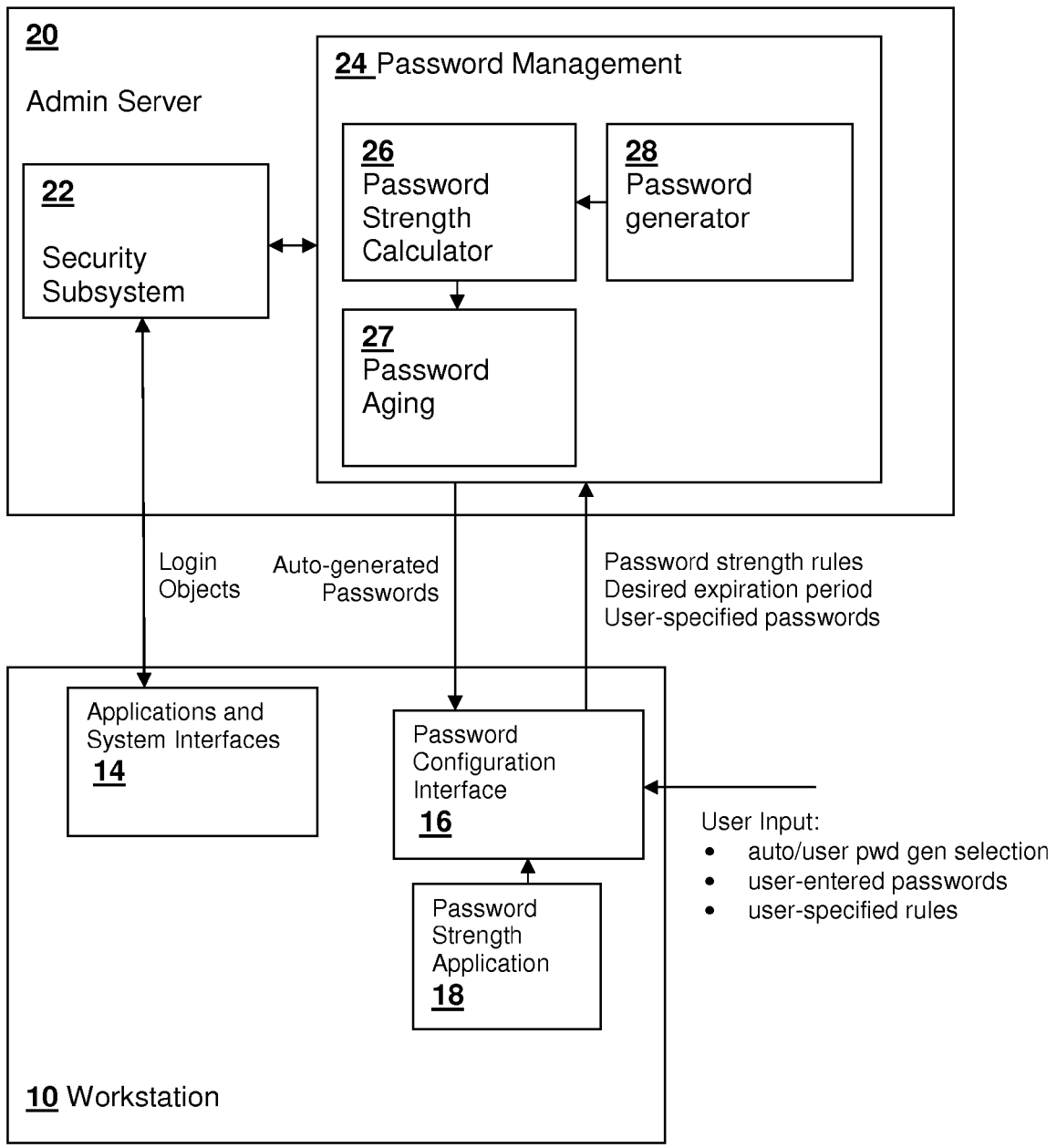
FIG. 2 is an organizational and flow diagram of a password management process within the system of FIG. 1.

Referring now to FIG. 2, an organization and information flow within the system of FIG. 1 is illustrated. Administrative server 20 includes a security subsystem 22 from which login objects are transferred to workstation computer 10 via JAVA objects or another transfer technique. (JAVA is a trademark of Sun Microsystems, Inc.) The specific login objects provided to workstation computer 10, or other local security services in workstation computer 10 that are deployed from administrative server 20, or which are configured by administrative server 20, receive tokens for which access is granted by entry of a password to the login objects or other security interfaces. The passwords used to generate the security tokens are maintained and/or generated by a password management module 24 that controls the expiration period of the passwords and "expires" them when their expiration period has elapsed. Password management module 24 signals security subsystem 22 to deny access to the resources protected by a password when that password has expired. Generally, a user or administrator that controls the password is notified as expiration approaches, or is prompted to provide or accept a new password when access is attempted after the password has expired.

Password management module 24 includes routines, objects and/or services that provide for control of password expiration based on password strength. A password aging module 27 controls the actual expiration of the password, and is informed of the proper expiration period for a password by a password strength calculator 26. A password generator 28 is used for generating system-provided passwords, but is not needed if the system uses only user-supplied passwords. In the exemplary embodiment, workstation computer 10 receives login objects from administrative server 20 and uses them to control access to applications and system interfaces 14. A password configuration interface 16 provides an interface to password management subsystem 24 in administrative server in the exemplary embodiment, but it is understood that in individual computers and devices, the password management and configuration may be contained within the same device. A user may provide passwords, select between automatic (system) generation of passwords or user-supplied passwords as input to password configuration interface 16. A user (generally an administrator to avoid users bypassing the aging scheme) can provide user-specified rules for password again based on characteristics of the password that determine password strength. A password strength application 18 may be provided and may be a stand-alone password strength calculator that either provides information to password configuration interface 16 directly or may inform the user/administrator of the strength of a particular password, which the user/administrator the provides as input to password configuration interface 14.

Password strength can be calculated using a formula or table that provides a strength value, e.g., a factor from 0 to 1.0 or a percentage of the maximum password expiration period acceptable by the system. A minimum strength may be included as an offset to the minimum factor or percentage. The factor may be expressed as:

$$F = \Sigma c_k p_k$$

where F is the password strength factor, $c_k$ are coefficients for each of a number of password characteristics, and $p_k$ are various characteristics of the password that are used to determine the strength. The password expiration period can then be expressed as:

$$T_{exp} = FT_{max}$$

where $T_{exp}$ is the expiration period and $T_{max}$ is the maximum password expiration period. The above formula is only exemplary and other more complex formulae may be employed to calculate password expiration periods. The characteristics of a password may include some or all of the characteristics shown in Table I, one of which is the overall length of the password. Table II also illustrates an alternative to the computational formula shown above. Rather than multiply values for the characteristics by coefficients, Table I can be used as a look-up table containing partial strength values. The partial strength values for each of the password characteristics are determined from ranges of values for the characteristics according to the Table I, in which the next lower strength value (or matching strength value) is used for the corresponding characteristic value. The partial strength values for all of the characteristics are then summed to form an aggregate strength value F, which is then used to compute the expiration period. Table I can alternatively populated with partial expiration period values, which are added to determine the entire expiration period.

TABLE I

| Length | Number of capital letters | Number of numerals | Number of punctuation marks | Dictionary matches | Rearranged word count | Name matches | % range |
|---|---|---|---|---|---|---|---|
| 1-30 reject | 0-2 reject | 0-2 reject | 0-5 reject | 0-4 1/7 | 0-6 1/7 | 0-1 1/7 | Range <0 |

TABLE I-continued

| Length | Number of capital letters | Number of numerals | Number of punctuation marks | Dictionary matches | Rearranged word count | Name matches | % range |
|---|---|---|---|---|---|---|---|
| 0 | 0 | 0 | 0 | 1/7 | 1/7 | 1/7 | 0 |
| 1/28 | 1/28 | 1/28 | 1/28 | 3/28 | 3/28 | 3/28 | 25 |
| 1/14 | 1/14 | 1/14 | 1/14 | 1/14 | 1/14 | 1/14 | 50 |
| 3/28 | 3/28 | 3/28 | 328 | 1/28 | 1/28 | 1/28 | 75 |
| 1/7 | 1/7 | 1/7 | 1/7 | 0 | 0 | 0 | 100 |
| 1/7 | 1/7 | 1/7 | 1/7 | reject | reject | reject | >100 |

The password characteristics listed in Table 1, which is not an exhaustive list, nor a required list of characteristics, includes the overall length of the password, the number of capital letters in the password, the number of numeric digits, the number of punctuation marks, the number of dictionary matches, the number of "hits" on re-arranged word search and the number of matches with fields in the user's name or user ID. The values in the table, which are used as partial strength values, are illustrated as fractions of a unity strength factor for illustrative purposes. Also, for illustrative purposes, the various characteristics are all weighted equally with respect to a range of values for each of the characteristics. However, in practice, the characteristics will generally be weighted differently. The range expressed in the second row of the table is mapped to the fourth through eighth row of the tables as a percentage expressed in the rightmost column of the table. Exceeding an acceptable threshold of each range (below 0% for the desirable characteristics and above 100% for the undesirable characteristics) leads to rejection of a password, as illustrated in rows 3 and 9 of Table I. Exceeding the other extreme of the range causes no further increase in password strength. Between the acceptable extreme for each range and the other extreme, the exemplary table maps the values linearly at 1/4, 1/2, 3/4 and the full range, which are scaled by 1/7 to account for the number of characteristics being measured. An algorithm sums the partial strength factors in Table I to arrive at a final strength factor. For example, the password R5a5b5b5i5t& for userID john named John Marshall has the characteristics as shown in table II, below, assuming that the re-arranged word algorithm excludes interspersed character arrangements. The resultant strength factor is 17/28=0.607 and in the example, if the maximum password expiration period is 90 days, the calculated expiration period would be 54 days. The expiration periods can be quantized so that periods such as a nominal month, e.g. 30, 60, 90 days result, and in that case, the 54 day expiration period could be reduced to 30 days or "rounded-off" to 60 days.

Other indicators of strength that may be used in the present invention include criteria that measure the number of lower case and upper case letters, so that more complete mixtures of the two are more favored, filters that catch alternating case, filters that require a password to start with a letter (for systems compatibility), increased weighting for punctuation marks and numbers encased between letters, and matching systems that catch re-arrangements of user names and user IDs.

Figure 3:
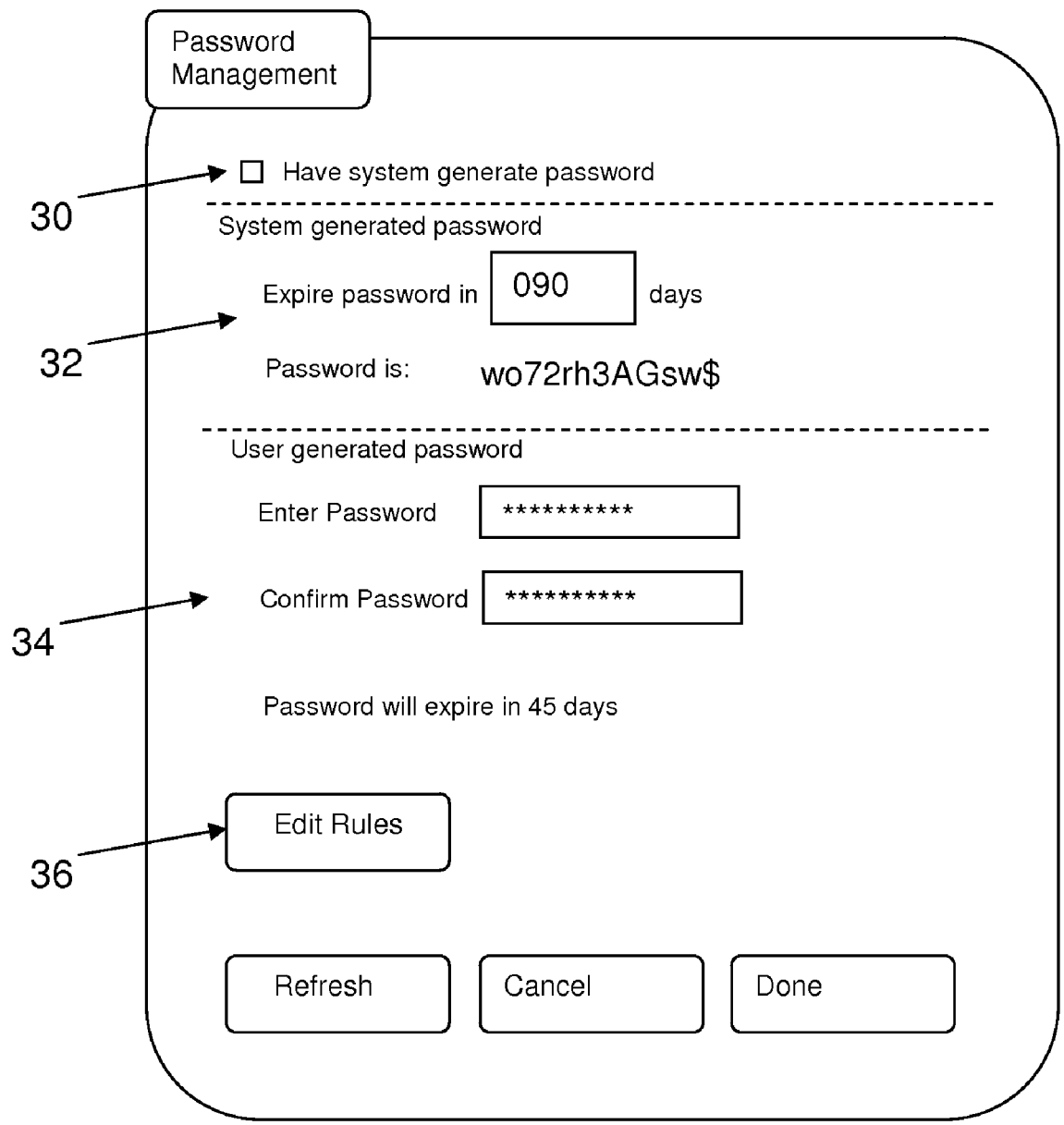
FIG. 3 is a pictorial diagram depicting a property page of a user interface for controlling a password management process in accordance with an embodiment of the present invention.

Referring now to FIG. 3, a user interface screen for providing user input to controlling a password management process in accordance with an embodiment of the invention is shown. The depicted display shows a property page, displaying a control panel for the password management system described above. User input is provided in two regions of the property page, which are active based upon the state of a selection box 30, which selects between automatic password generation (system generated) and user input password acceptance. As noted above, the handling of system-generated passwords differs from user-generated passwords, which is reflected in the associated user input areas of FIG. 3. User input area 32, which will generally be grayed-out when user-provide passwords are selected, has an input box for the user to specify the number of days the password should remain active. The system generates a password having sufficient strength to merit the desired password expiration period and displays the password for the user to memorize. User input area 34, which will generally be grayed-out when system-generated passwords are selected, has input fields for the user to specify and confirm a password. The password management subsystem then calculates the strength of the password and determines an expiration period for the password, which is displayed to the user. A button 36 is provided for editing rules and strength weightings, which activates a table display similar to that shown in Table II, from which a user (generally an administrator) can set the ranges and coefficients for weighting password strength, as well as acceptable thresholds for the various characteristics. The user interface of FIG.

TABLE II

| Length | Number of capital letters | Number of numerals | Number of punctuation marks | Dictionary matches | Rearranged word count | Name matches | |
|---|---|---|---|---|---|---|---|
| 1-30 | 0-2 | 0-2 | 0-5 | 0-4 | 0-6 | 0-1 | Range |
| 11 | 1 | 5 | 1 | 0 | 0 | 0 | value |
| 0.322 | 0.50 | 1.0 | 0.125 | 0 | 0 | 0 | % Range |
| 25% | 50% | 50% | 0% | 100% | 100% 1 | 100% | next lower range in Table I |
| 1/28 | 1/14 | 1/14 | 0 | 1/7 | 1/7 | 1/7 | value from rows 3-9 of Table I |

3 is only one example of a user interface for controlling a password management subsystem in accordance with an embodiment of the present invention, and there are many suitable variations available. For example, for non-administrative users, it may be undesirable to display the password expiration period and merely remind users when their password has expired. It may also be desirable to remove the option between system-generated and user-specified password modes, in which case, a non-administrative user may be presented with only the Enter/Confirm password fields when a password has expired or when the user initiates a password change. Alternatively, a user may be provided only with a new password calculated based on a password expiration period specified by a system administrator, which is presented at password initiation, or in response to a request to change the password.

Figure 4:
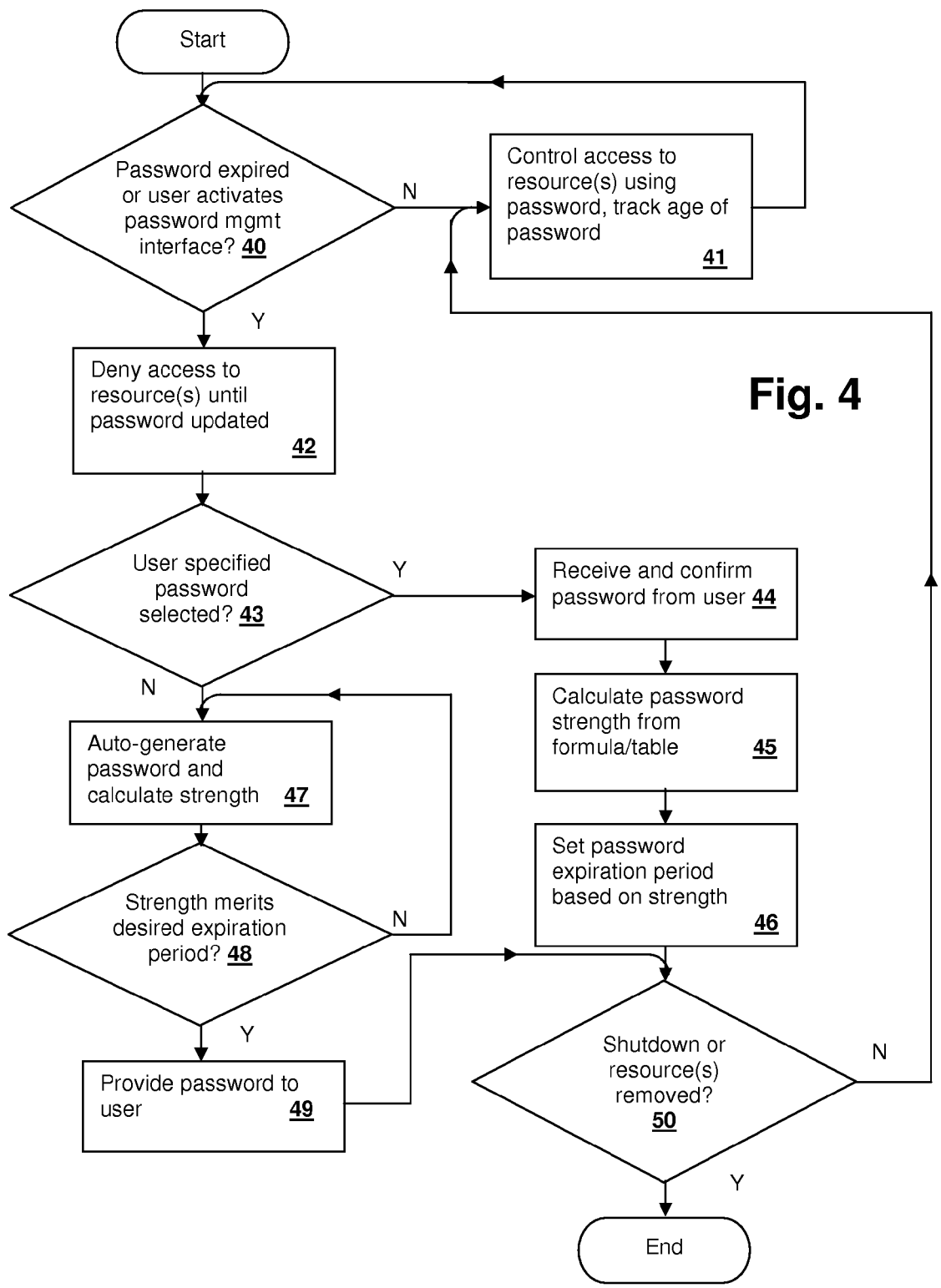
FIG. 4 is a flow chart of a password aging method in accordance with an embodiment of the present invention.

Referring now to FIG. 4, a password management method in accordance with an embodiment of the present invention is depicted in a flowchart. First, the system determines whether a password has expired or a user has activated a password management interface (decision 40). If not, control to the managed resources proceeds based upon the password and the age of the password is continually tracked (step 41) If the password has expired or the user has activated the password management interface (decision 40), access to the resource(s) is denied until the password is updated (step 42). If user-specified passwords are selected (decision 43), a new password is received from and confirmed by the user (step 44), the strength of the password is calculated from the formula/table (step 45) and the password expiration period is set based on the calculated strength (step 46). If system-generated passwords are selected (decision 43), a new password is generated and the strength calculated (step 47), if the strength of the password does not merit the desired expiration period specified by the user (decision 48), step 47 is repeated, otherwise the password is provided to the user (step 49). Enforcement of the password management algorithm continues until the system is shut down or the protected resource(s) are removed (decision 50).

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A computer-performed method for controlling expiration of a password, comprising:
   computing, within a computer system, a strength of the password from a formula that relates the length of the password and the types of characters included in the password to a resultant strength value;
   setting, within the computer system, an expiration period for the password in conformity with the resultant strength value, so that for a greater length of the password and a greater number of types of characters included in the password, a longer expiration period is set for the password and so that for lesser length of the password and a lesser number of types of characters included in the password, a shorter expiration period is set for the password;
   placing the password into service within the computer system, wherein the password controls access to one or more resources within the computer system;
   tracking, by the computer system, an age period corresponding to how long the password has been in effect;
   denying access to the one or more resources accessible by the computer system in response to the age period becoming equal to or greater than the expiration period;
   further in response to the age period becoming equal to or greater than the expiration period, automatically generating, by a password management subsystem of the computer system, a new password that replaces the password for providing access to the one or more resources, wherein the computing is performed to generate the new password according to a specified expiration period, wherein the new password automatically generated by the password management subsystem has a strength value sufficient for the specified expiration period; and
   in response to completing the automatically generating, automatically placing the new password into service within the computer system to control access to the one or more resources.

2. The computer-performed method of claim 1, wherein the computing is performed by a password strength computation tool and wherein the computed strength is provided by the user or an administrator as an input to a password configuration control.

3. The computer-performed method of claim 1, wherein the computing comprises matching characteristics of the password with a table of criteria, wherein the table contains values delimiting ranges of each of the criteria and corresponding partial strength values, wherein the formula comprises a sum of the partial strength values as determined for each of the characteristics by locating a range for each of the characteristics within the table.

4. The computer-performed method of claim 1, further comprising:
   determining, by the computer system and from a selection value, whether the password is to be generated automatically or provided by a user or an administrator;
   responsive to determining that the password is to be generated automatically, receiving, by the computer system, a desired expiration period from the user or the administrator, wherein the computing is performed in conjunction with the generating to generate the password having the desired expiration period and setting the expiration period to the desired expiration period; and
   responsive to determining that the password is to be provided by the user, receiving, by the computer system, the password from a user input provided by the administrator or the user, and wherein the expiration period is set in conformity with the computed strength of the password as determined from the formula.

5. A computer system for controlling the expiration of a password, the computer system comprising;
   a processor, a computer-readable memory and a computer-readable tangible storage device;
   program instructions, stored on the storage device for execution by the processor via the memory, to compute a strength of the password from a formula that relates the length of the password and types of characters included in the password to a resultant strength value;
   program instructions, stored on the storage device for execution by the processor via the memory, to set an expiration period for the password in conformity with the resultant strength value, so that for a greater length of the password and a greater number of types of characters included in the password, a longer expiration period is set for the password and so that for lesser length of the password and a lesser number of types of characters included in the password, a shorter expiration period is set for the password;

program instructions, stored on the storage device for execution by the processor via the memory, to place the password into service within a computer system, wherein the password controls access to one or more resources within the computer system;

program instructions, stored on the storage device for execution by the processor via the memory, to track an age period corresponding to how long the password has been in effect;

program instructions, stored on the storage device for execution by the processor via the memory, to deny access to the one or more resources in response to the age period becoming equal to or greater than the expiration period;

program instructions, stored on the storage device for execution by the processor via the memory, and forming part of a password management subsystem of the computer system, to automatically generate a new password that replaces the password for providing access to the one or more resources in response to the age period becoming equal to or greater than the expiration period generating, wherein the program instructions to compute generate the new password according to a specified expiration period, wherein the new password automatically generated by the password management subsystem has a strength value sufficient for the specified expiration period; and program instructions, stored on the storage device for execution by the processor via the memory, to, in response to completing automatic generation of the new password, automatically place the new password into service to control access to the one or more resources.

6. The computer system of claim 5, further comprising:
program instructions, stored on the storage device for execution by the processor via the memory, to receive the computed strength from a user input provided by a user or an administrator.

7. The computer system of claim 5, wherein:
the program instructions to compute match characteristics of the password with a table of criteria, wherein the table contains values delimiting ranges of each of the criteria and corresponding partial strength values, wherein the formula comprises a sum of the partial strength values as determined for each of the characteristics by locating a range for each of the characteristics within the table.

8. The computer system of claim 5, further comprising:
program instructions, stored on the storage device for execution by the processor via the memory, to determine from a selection value, whether the password is to be generated automatically or provided by a user or an administrator;

program instructions stored on the storage device for execution by the processor via the memory, to, responsive to determining that the password is to be generated automatically, receive a desired expiration period from the user or the administrator, wherein the program instructions to compute are executed in conjunction with the program instructions that generate to generate the password having the desired expiration period and set the expiration period to the desired expiration period; and program instructions stored on the storage device for execution by the processor via the memory, to, responsive to determining that the password is to be provided by the user, receive he password from a user input provided by the administrator or the user, and set the expiration period in conformity with the computed strength of the password as determined from the formula.

9. A computer program product to control expiration of a password, the computer program product comprising:
a computer-readable tangible storage device;
program instructions, stored on the storage device, to compute a strength of the password from a formula that relates the length of the password and the types of characters included in the password to a resultant strength value;

program instructions, stored on the storage device, to set an expiration period for the password in conformity with the resultant strength value, so that for a greater length of the password and a greater number of types of characters included in the password, a longer expiration period is set for the password and so that for lesser length of the password and a lesser number of types of characters included in the password, a shorter expiration period is set for the password;

program instructions, stored on the storage device, to place the password into service within a computer system, wherein the password controls access to one or more resources within the computer system;

program instructions, stored on the storage device, to track an age period corresponding to how long the password has been in effect;

program instructions, stored on the storage device, to deny access to the one or more resources in response to the age period becoming equal to or greater than the expiration period;

program instructions, stored on the storage device, and forming part of a password management subsystem of the computer system, to automatically generate a new password that replaces the password for providing access to the one or more resources in response to the age period becoming equal to or greater than the expiration period generating, wherein the program instructions to compute generate the new password according to a specified expiration period, wherein the new password automatically generated by the password management subsystem has a strength value sufficient for the specified expiration period; and program instructions, stored on the storage device, to, in response to completing the automatic generation of the new password, automatically place the new password into service to control access to the one or more resources.

10. The computer program product of claim 9, further comprising:
program instructions, stored on the computer-readable, tangible storage device, to receive the computed strength from a user input provided by a user or an administrator.

11. The computer program product of claim 9, wherein the program instructions to compute match characteristics of the password with a table of criteria, wherein the table contains values delimiting ranges of each of the criteria and corresponding partial strength values, wherein the formula comprises a sum of the partial strength values as determined for each of the characteristics by locating a range for each of the characteristics within the table.

* * * * *